(12) United States Patent
Bourdelais et al.

(10) Patent No.: US 7,345,621 B2
(45) Date of Patent: Mar. 18, 2008

(54) REAL-TIME MULTISTATIC RADAR SIGNAL PROCESSING SYSTEM AND METHOD

(75) Inventors: John M. Bourdelais, Vienna, VA (US);
Ernest Scott Stickles, Lothian, MD (US); William Ray Wright, Springfield, VA (US); David Earl Norris, Fairfax Station, VA (US); Michael Anthony Tiberio, Arlington, VA (US); Gary Dana Butler, Alexandria, VA (US)

(73) Assignee: BBN Technologies Corp., Cambridge, MA (US)

( * ) Notice: Subject to any disclaimer, the term of this patent is extended or adjusted under 35 U.S.C. 154(b) by 0 days.

(21) Appl. No.: 11/710,868

(22) Filed: Feb. 26, 2007

(65) Prior Publication Data

US 2007/0268182 A1   Nov. 22, 2007

Related U.S. Application Data

(63) Continuation of application No. 11/112,390, filed on Apr. 22, 2005, now Pat. No. 7,199,750.

(51) Int. Cl.
*G01S 13/08* (2006.01)

(52) U.S. Cl. ............................ 342/90; 342/95; 342/96; 342/97; 342/108; 342/146; 342/126; 342/140; 342/107; 342/133; 342/189; 342/195

(58) Field of Classification Search ............ 342/90–99, 342/59, 108, 146, 126, 147, 140, 158, 107, 342/135, 131, 133, 189, 195
See application file for complete search history.

(56) References Cited

U.S. PATENT DOCUMENTS

| 7,155,240 | B2 * | 12/2006 | Atkinson et al. | ........ 455/456.2 |
| 7,199,750 | B2 * | 4/2007 | Bourdelais et al. | ........... 342/90 |
| 2006/0238407 | A1 * | 10/2006 | Bourdelais et al. | ........... 342/90 |

* cited by examiner

*Primary Examiner*—John B. Sotomayor
(74) *Attorney, Agent, or Firm*—Proskauer Rose LLP (57) ABSTRACT

A real-time signal processing engine robustly detects, localizes, tracks and classifies ground targets based on radar signals from a multistatic radar system. The system differentiates between different targets based on an optimized cost function, which can include the total returned normalized pulse energy. The local transmitters/receivers can communicate with each other via the transmitted radar signals.

36 Claims, 6 Drawing Sheets

REAL-TIME MULTISTATIC RADAR SIGNAL PROCESSING SYSTEM AND METHOD

CROSS REFERENCES TO RELATED APPLICATIONS

This application is a continuation of U.S. application Ser. No. 11/112,390, filed Apr. 22, 2005, now U.S. Pat. No. 7,199,750, the disclosure of which is hereby incorporated by reference.

STATEMENT REGARDING FEDERALLY SPONSORED RESEARCH AND DEVELOPMENT

This invention was made with government support under DARPA Contract Number MDA972-03-C-0083. The Government has certain rights in the invention.

BACKGROUND OF THE INVENTION

The invention is directed to a multistatic radar system with real-time signal processing for detecting, localizing, characterizing and tracking ground targets of interest. Ground clutter and signals from stationary targets are identified and removed at the local radar receivers.

In many situations, there is a need to monitor ground-based objects and targets, for example, to prevent home intrusion, burglaries, and for military applications, such as perimeter surveillance. Often, it is important to not only detect these targets, but also to discriminate between targets. Targets of interest can be, for example, humans on foot, wheeled or tracked vehicles. Such surveillance poses particular challenges in foliage environments as radio frequency (RF) energy experiences attenuation, dispersion, and modulation, making it difficult to detect and/or discriminate targets from stationary and non-stationary clutter. Single narrowband monostatic radar systems tend to have poor range resolution, and in spite of higher transmitted power have limited coverage area in foliage environments due to attenuation and multi-path fading.

Accordingly, there is a need for a radar tracking system that can efficiently detect and track moving targets, in particular multiple targets, and discriminate between targets and stationary and moving clutter under adverse environmental conditions. There is also a need to distinguish between and classify different types of targets, for example, humans, animals, and vehicles of different size.

SUMMARY OF THE INVENTION

The invention addresses the deficiencies in the prior art by, in various embodiments, providing methods and systems for detecting, localizing, identifying, characterizing, and/or tracking one or more ground targets by real-time processing of ultra-wideband signals from a multistatic radar system. The forward-scattered or backscattered radar signals are filtered and processed at the node level to eliminate signals unlikely to be associated with an actual target. A target ellipse for a potential target is also identified at the node level from the received radar signals.

According to one aspect, the invention provides a method for identifying a target using a multistatic radar system having at least one radar transmitter and a plurality of radar receivers arranged in node pairs. The method includes receiving at a receiver a radar signal from a corresponding transmitter of the node pair, filtering the received radar signal and identifying from the filtered radar signal probable target data, transmitting the probable target data from at least two transmitter-receiver node pairs to a central node, identifying at the central node from the probable target data a location of a first target, removing from the probable target data the data associated with the first target location, and determining a location of an additional target from the remaining probable target data.

According to another aspect, the invention provides a method for identifying a target using a multistatic radar system having at least one radar transmitter and a plurality of radar receivers forming node pairs. The method includes receiving target data from a target in at least two receivers defining node pairs, wherein the received target data define a target ellipse at each of the node pairs, by determining points of intersection between the target ellipses, associating a cost function with the points of intersection, and assigning a first target to the point of intersection having the lowest cost function.

According to a further aspect, the invention provides a method for classifying a target using a multistatic radar system having at least one radar transmitter and a plurality of radar receivers arranged in node pairs. The method includes receiving at least two receivers radar signals from the transmitter of a corresponding node pair, associating the received radar signals with a target and with a relative motion of parts of the target, determining a location of the target, and classifying the target based on the radar signals received from a target and the relative motion of the parts of the target.

According to another aspect, the invention provides a multistatic radar tracking system with at least one radar transmitter and a plurality of radar receivers arranged in node pairs. The transmitter emits radar signals composed of ultra-short wide bandwidth radio frequency pulses. The system further includes a filter for identifying at the receiver level from a radar signal received at the receiver of a node pair a target ellipse for a potential target. The system also includes a real-time radar signal processing engine for determining from the at least two target ellipses a first target location, and for determining an additional target location after removing the target ellipses used to determine the first target location.

Embodiments of the invention may include one or more of the following features. The received radar signals may be filtered to suppress out-of-band energy, to time-align successively received radar signals and/or to scale, smooth and normalize the received signals. Probable target data may be identified by determining backscattered energy of the received radar signal and by comparing the backscattered energy with a predetermined reference value. Probable target data may also be identified by determining a target speed and comparing the determined target speed with a probable target speed of the target.

The location of the first target may be identified by determining from the probable target data a total backscattered energy, and selecting as the location of the first target the location having a greatest total backscattered energy. Alternatively or in addition, the location of the first target may be identified by associating a cost function with potential target locations, wherein the cost function represents a measure of likelihood that a target is present at the location, and by selecting the location of the first target by optimizing the cost function. For detecting multiple targets, the target ellipses that include the target data for the first target may be removed and a second target may be assigned to the point of intersection having the next-lowest cost function. An exemplary cost function may include a received normalized pulse energy, a bistatic angle for the received pulse energy, a range—velocity characteristic of the target, and/or a separation between closely-spaced points of intersection located on at least three intersecting ellipses.

Previously known or previously measured forward-scattering and backscattering radar cross sections may be used to estimate a range for a likely bistatic angle for the probable target data, which may narrow the parameter space to be considered and may also disambiguate target locations.

A target can be classified by tracking an identified target over a predetermined time, building a three-dimensional image of the target by analyzing target data received from a plurality of the node pairs, monitoring changes in the three-dimensional image during the predetermined time, and assigning a target type to the target based on the monitored changes. Potential target types may be, for example, vehicles, livestock, and humans, which can be differentiated, for example, based on their size and radar cross section. In addition, the node pairs may be configured for receiving radar signals from different vantage points to form a three-dimensional radar image of the target. Further, the target can be viewed from multiple aspects (using one or more receivers) and its radar cross section monitored for changing levels enabling classification.

Further features and advantages of the invention will be apparent from the following description of illustrative embodiments and from the claims.

BRIEF DESCRIPTION OF THE DRAWINGS

The following figures depict illustrative embodiments of the invention in which like reference numerals refer to like elements. These depicted embodiments are to be understood as illustrative of the invention and not as limiting in any way. The use of the same reference symbols in different drawings indicates similar or identical items. The drawings may not be to scale.

DESCRIPTION OF ILLUSTRATED EMBODIMENTS

As described above in summary, the invention provides, in various embodiments, systems and methods for detecting and tracking one or more moving targets using multistatic ultra-wideband radar, and for distinguishing between and/or classifying different types of targets.

Figure 1:
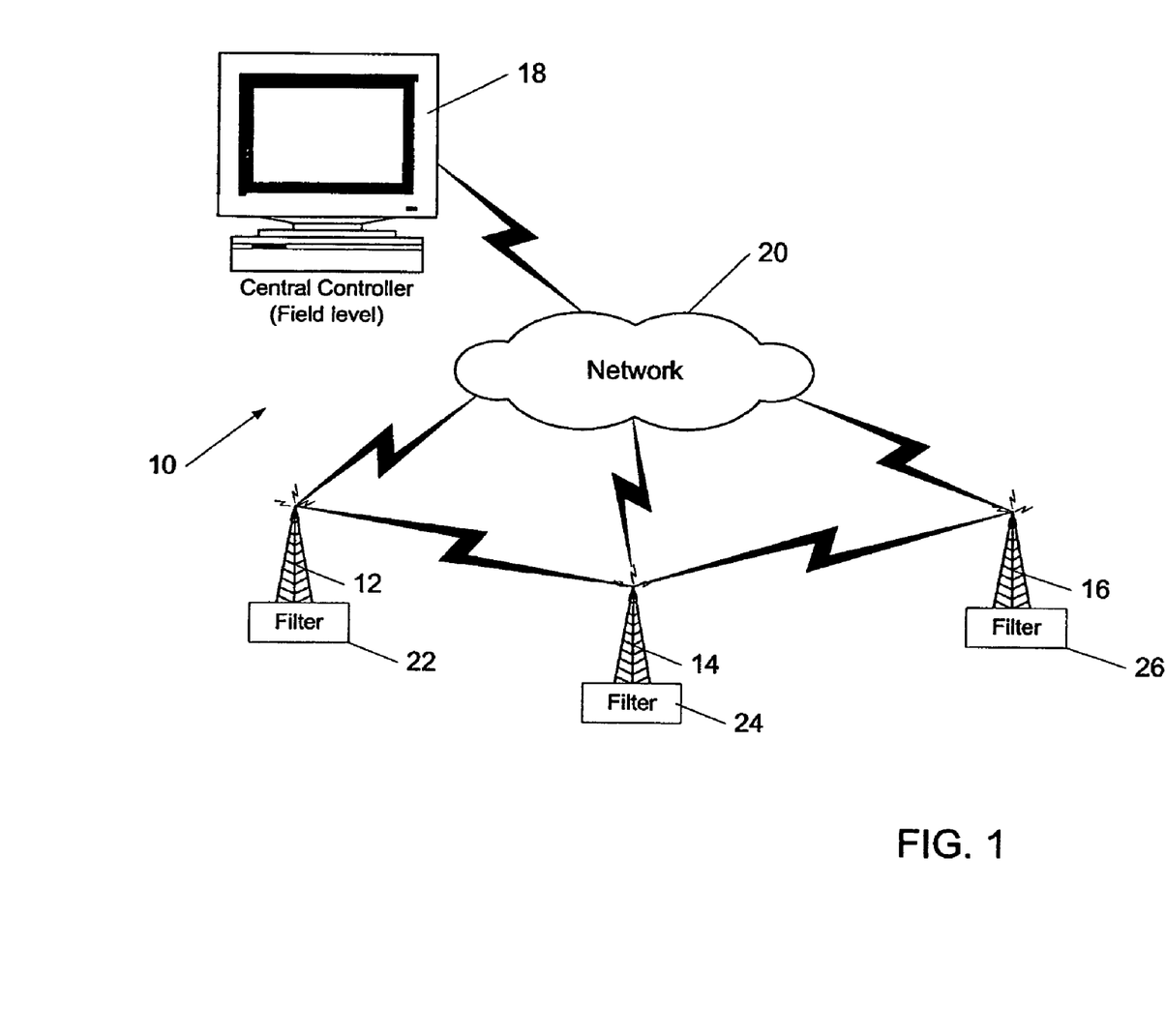
FIG. 1 shows schematically an exemplary configuration of a multistatic radar system.

FIG. 1 shows schematically a multistatic radar system 10 having one or more transmitters, for example, transmitter 12, emitting ultra-short wide bandwidth radio frequency pulses and a plurality of distributed receivers, for example, receivers 14, 16 capable of detecting forward scattered and/or backscattered radar signals representing the reflections from the local environment. Further, each transmitter and/or receiver can be configured to communicate radar signal information with another transmitter and/or receiver and/or with a central base station 18. The communication between the transmitters/receivers can be point-to-point or via a network 20, and can be wired or wireless, using, for example, conventional communication protocols, such TCP/IP. Distributed receivers can provide diverse views of a target at any one location from different observation points, enabling a more precise target localization than monostatic radar systems, combined with system robustness in the event of a node failure, i.e., the failure of one transmitter-receiver node pair. The central base station 18 can control the various transmitters/receivers 12, 14, and 16 and perform central data collection and data processing, also referred to as "field-level control." Any one of the illustrative transmitters/receivers 12, 14, and 16 may be configured to operate as receiver or transmitter or both, and may include a respective filter 22, 24, 26 for processing at the receiver level a forward or backscattered radar signal associated with a potential target.

Figure 2:
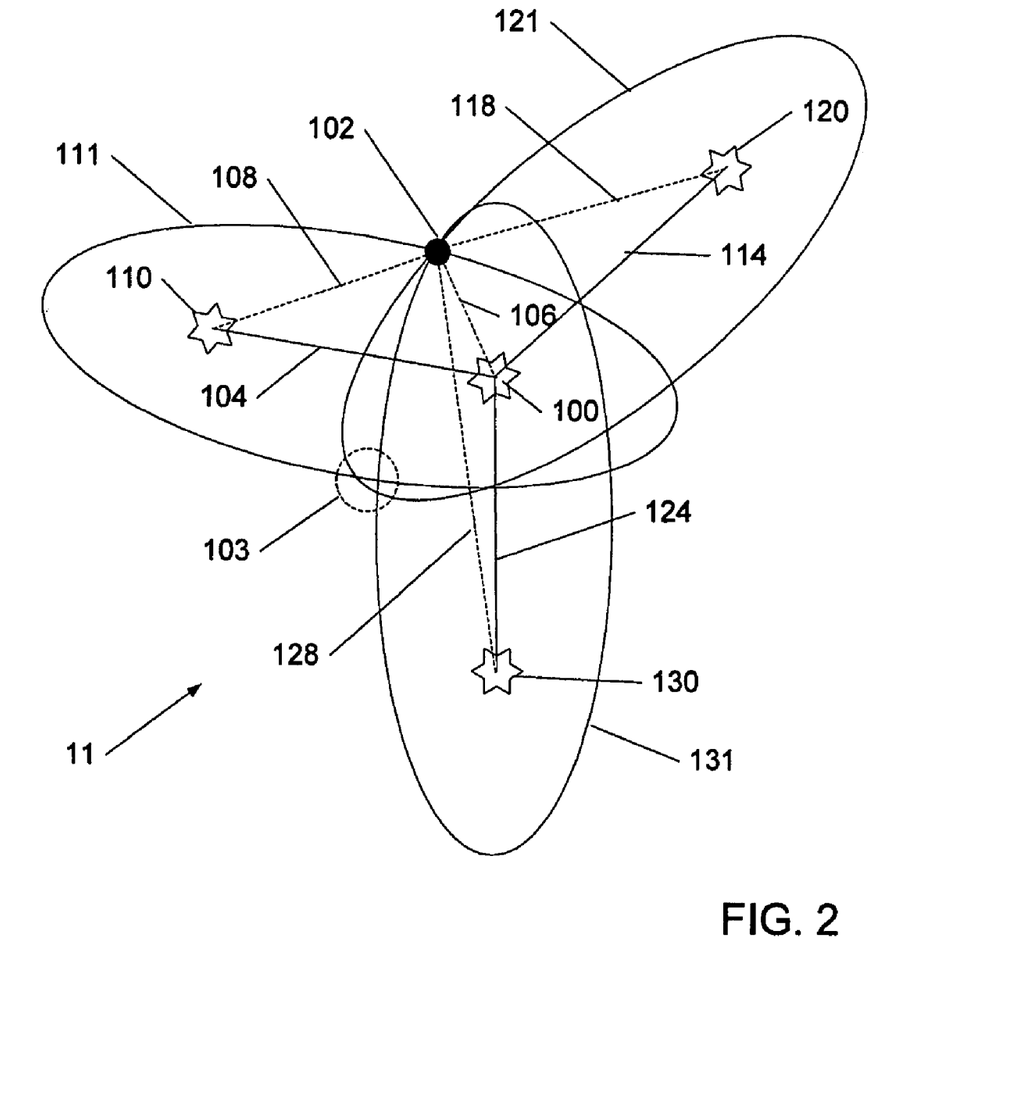
FIG. 2 shows a basic diagram of possible target ellipses and target localization with a multistatic radar system.

Referring now to FIG. 2, an illustrative multistatic UWB radar system 11 includes at least one UWB transmitter 100 and several UWB receivers 110, 120, 130, whereby any two of the transmitter/receiver node pairs {100/110}; {100/120}; and {100/130} function as a bistatic radar system to facilitate target detection. The introduction of an object, such as an intruder 102, can alter the scan waveform received by one or more of the receivers 110, 120, 130 compared to the scan waveform without the intruder 102. The presence of the intruder 102 is now detectable in the subtraction of successive scans; any significant change in a portion of this difference reveals the range of the intruder 102 with respect to the placement of a scanning receiver, such as receiver 110. Knowing the direct distance between the transmitter 100 and the scanning receiver 110, which can be determined from the time-of-flight of the direct signal path 104 between transmitter 100 and receiver 110, and knowing the relative time delay of the target response in the scanned waveform (which travels from the transmitter 100 to the target 102 along path 106, and from the target 102 to the receiver 110 along path 108) with respect to the direct signal path 104, the position of the intruder 102 is known to lie somewhere on an ellipse 111 whose foci are the transmitter 100 and the receiver 110.

Likewise, the signal returned from target 102 travels along path 118 to receiver 120, and along path 128 to receiver 130, with the direct distance 114 between transmitter 100 and receiver 120, and the direct distance 124 between transmitter 100 and receiver 130 determined as before. The target coordinates of target 102 can thus be unambiguously determined from the point of intersection between the three ellipses 111, 121, and 131. It is also evident in FIG. 2 that signals received by only two transmitter-receiver node pairs may result in ellipses that intersect at more than one point or potential target location, causing ambiguities unless further information is utilized. Techniques used to resolve this ambiguity are discussed below.

The illustrative systems and methods include a radar signal processing engine (RSPE) capable of detecting targets of interest and filtering out clutter. Data is generated from a radar scan by measuring the backscattered energy as a function of range at a predetermined scan rate. For certain transmitter-receiver-target geometries where the target is near the line connecting the transmitter to the receiver, the forward scattered energy is incident on the receiver, typically resulting in an enhanced signal level. Scan data collected by a particular transmitter-receiver node pair is first filtered with a bandpass filter or matched filter to suppress out-of-band energy. The scans are then time-aligned relative to the direct arrival with reference scans (without a detected target). Signals can be adaptively scaled, for example based on an exponential smoothing filter combination of previous scans, to minimize false residuals after subtraction from the current scan. The magnitude output after subtraction is then normalized by the rms level in each transmitter-receiver cell to obtain a constant false alarm rate (CFAR). The subtraction process removes stationary clutter; however, moving clutter, such as tree branches, can still persist through the subtraction and potentially create unwanted false alarms. To eliminate false alarms or at least reduce the frequency of false alarms, any potentially detected target with a returned signal energy exceeding a predetermined threshold value passes through a range delay tracker that determines if over time the potential target has features (such as a predictable ground speed of certain types of moving targets, e.g. vehicles, intruders on foot) characteristic of a genuine target. Only those targets that meet the tracker filter criterion are passed on to a field level processor as potentially genuine targets. Targets exhibiting changes in location that are either unexpectedly slow or unexpectedly fast are dismissed.

Figure 3:
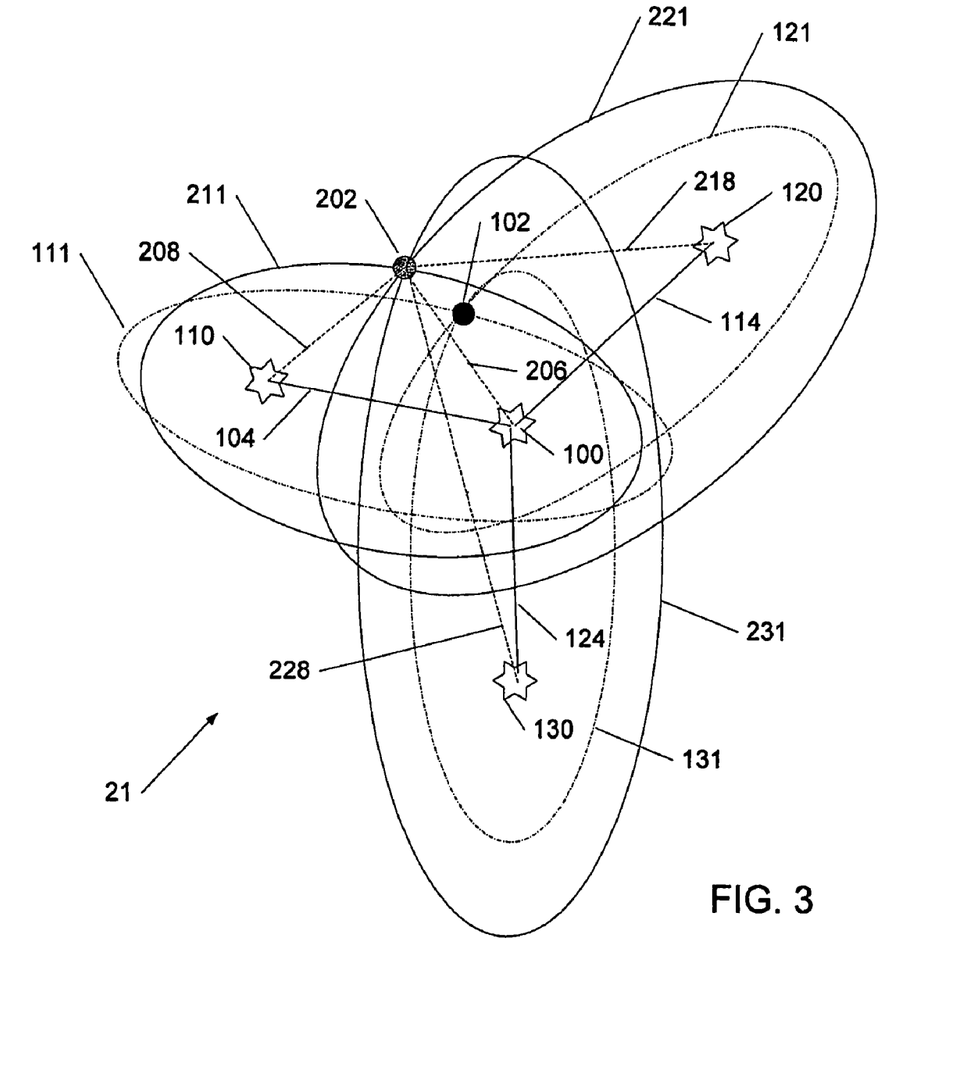
FIG. 3 shows a basic diagram when multiple targets are present.
Figure 4:
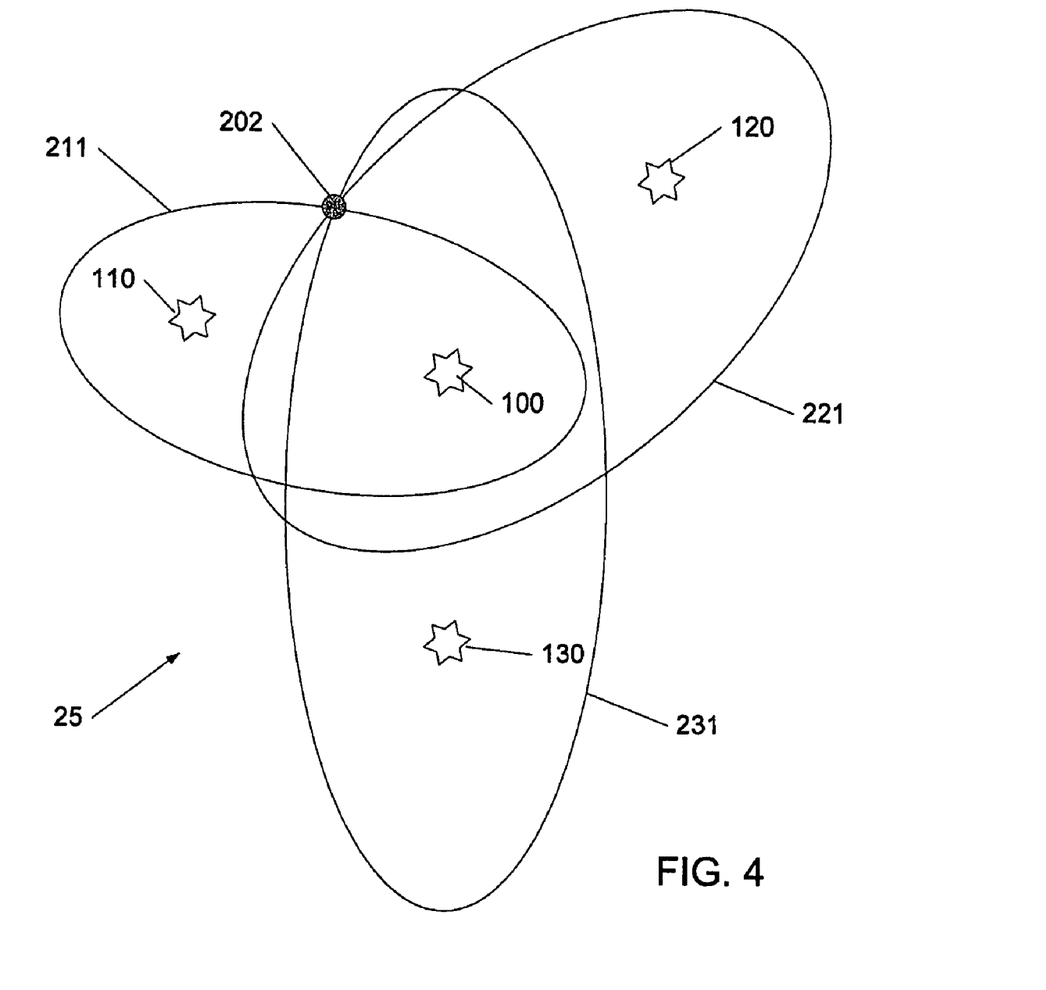
FIG. 4 shows a basic diagram after elimination of a first target with the method of the invention.

FIG. 3 shows a situation where the illustrative multistatic UWB radar system 21 detects several targets, such as the two exemplary targets 102, 202, which meet the tracker filter criterion at each receiver. The range ellipses associated with each target and the total normalized pulse energy returned from the targets 102 and 202 and measured at receivers 110, 120, 130 are passed to a field level processor. The field level processor associates the range ellipse intersections which are within a preset distance of one another with a potential target. A single ellipse may be associated with several potential targets (multiple target hypothesis). The energy passed from each receiver for the multiple range ellipses are summed for each potential target and used as a measure for the likelihood of having detected an actual target. For example, it will be assumed that the returned normalized pulse energy from target 102 is greater than from target 202. Accordingly, target 102 will be assumed to be a valid target and will be indicated as such on a target map. Thereafter, the target ellipses 111, 121, 131 are removed from the set of measured ellipses, leaving target ellipses 211, 221, 231 that define target 202, as indicated in FIG. 4. The process then repeats, with target 202 now being the target generating the greatest normalized pulse energy of the remaining targets (not shown).

It may arise that the three ellipses created by, for example, target 102 in FIG. 2, come within a preset distance from each other, as indicated in FIG. 2 by the circle 103, thus creating an ambiguity in the target definition. Two techniques can be used to address this issue. The first technique determines, for example, which prospective target location defined by the multiple ellipses has the lower spread, i.e., a smaller circle 103, in the intersection.

Figure 5:
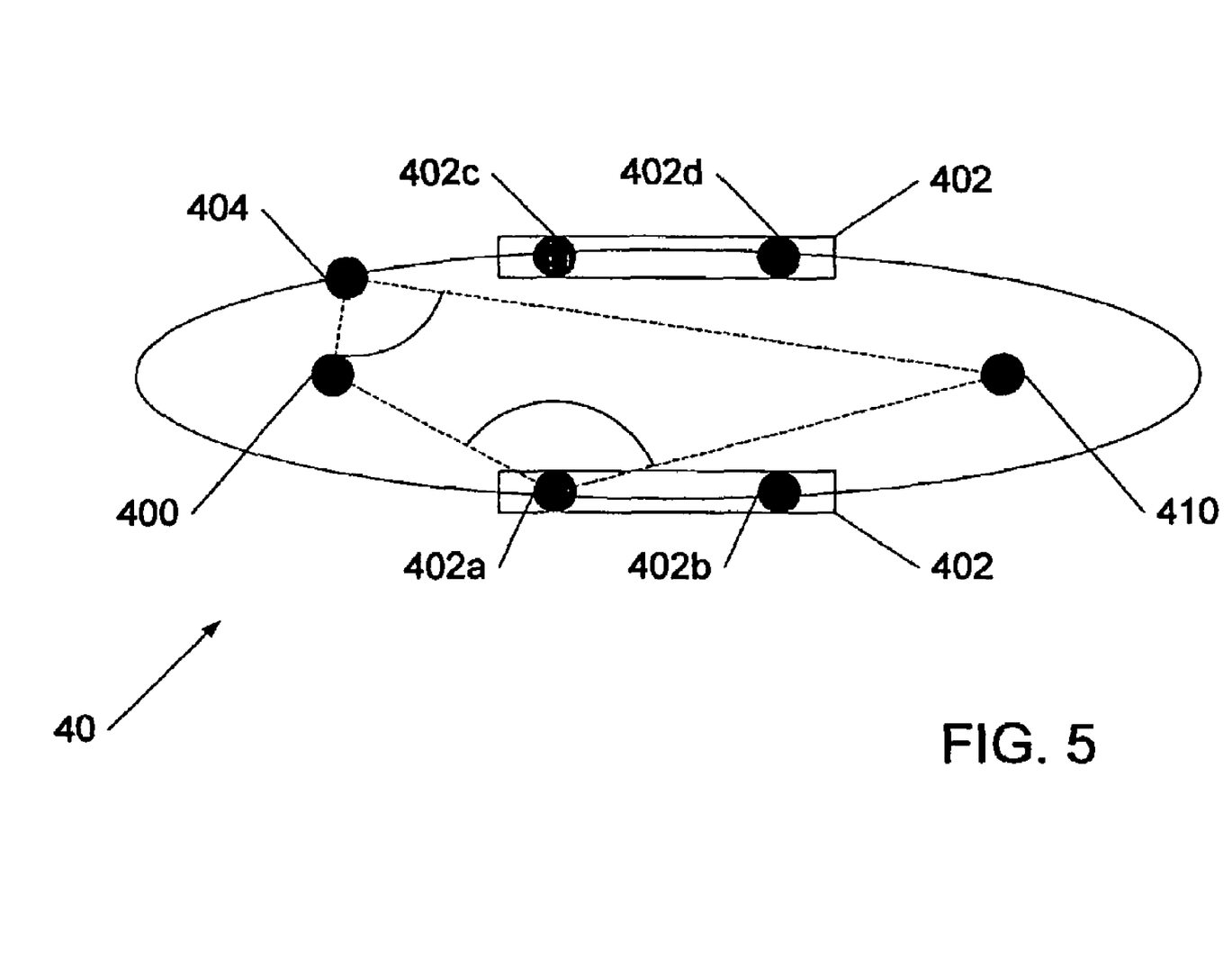
FIG. 5 shows a basic diagram for differentiating between targets based on backscattered and forward scattered energy with the method of the invention.

The second technique depicted in FIG. 5 takes advantage of the increase in signal strength from a target having a high bistatic angle. As shown in FIG. 5, an exemplary target 402a with a high bistatic angle α is positioned near the line connecting the transmitter 400 and the receiver 410. Another potential target 404 is shown as having a low bistatic angle α'. The radar cross section (RCS) of each target is estimated using range and location information. The target 402a with the high bistatic angle α located on the range ellipse 40 produces an enhanced received signal level which is associated with the four equivalent positions 402a, 402b, 402c, and 402d. If the signal enhancement as a function of bistatic angle is known, then the ambiguity between the low bistatic angle α' target location 404 (there are three additional ambiguous low bistatic angle positions, which have been omitted in FIG. 4) and the high bistatic angle α locations 402a, 402b, 402c, and 402d can be reduced from eight to four, namely to locations 402a, 402b, 402c, and 402d.

Since the four ambiguous points 402a, 402b, 402c, and 402d for each source-receiver ellipse will be at different locations, except for the true target location 402a, the ellipse association logic in the field processor can disambiguate between the localization points 402a, 402b, 402c, and 402d based on the radar cross section from all ellipses, as described above with reference to FIGS. 3 and 4.

The target ellipses can be removed at the local (transmitter/receiver pair) level by disregarding, for example, pulses returned within the time window represented by the removed ellipses. This can advantageously be achieved by embedding communications in the radar transmission, thus obviating the need for separate communication channels between transmitters and receivers. The communications allow for information about node pair tracks to be shared so that localization can be done at the field level, with the information to be sent to an end user.

In the determination of the most likely target, as in many optimization problems, the structure of potential solutions can reflect complex relationships between the different input parameters. While some parameter values may be judged to independently represent valid input data, other parameters may be closely related and should not be explored independently. It is therefore customary to assign to complex solutions a cost function that has local minima dependent on the input parameters, with the goal to find those input parameter values that optimize the cost function. Input parameters contributing to the cost function may be, for example, the tracker filter criterion, the received normalized pulse energy, the expected bistatic angle for the received pulse energy, the spread or diameter of the circle defined by intersecting ellipses, and the like.

An efficient algorithm for detecting and discrimination among different moving targets will be described below.

Figure 6:
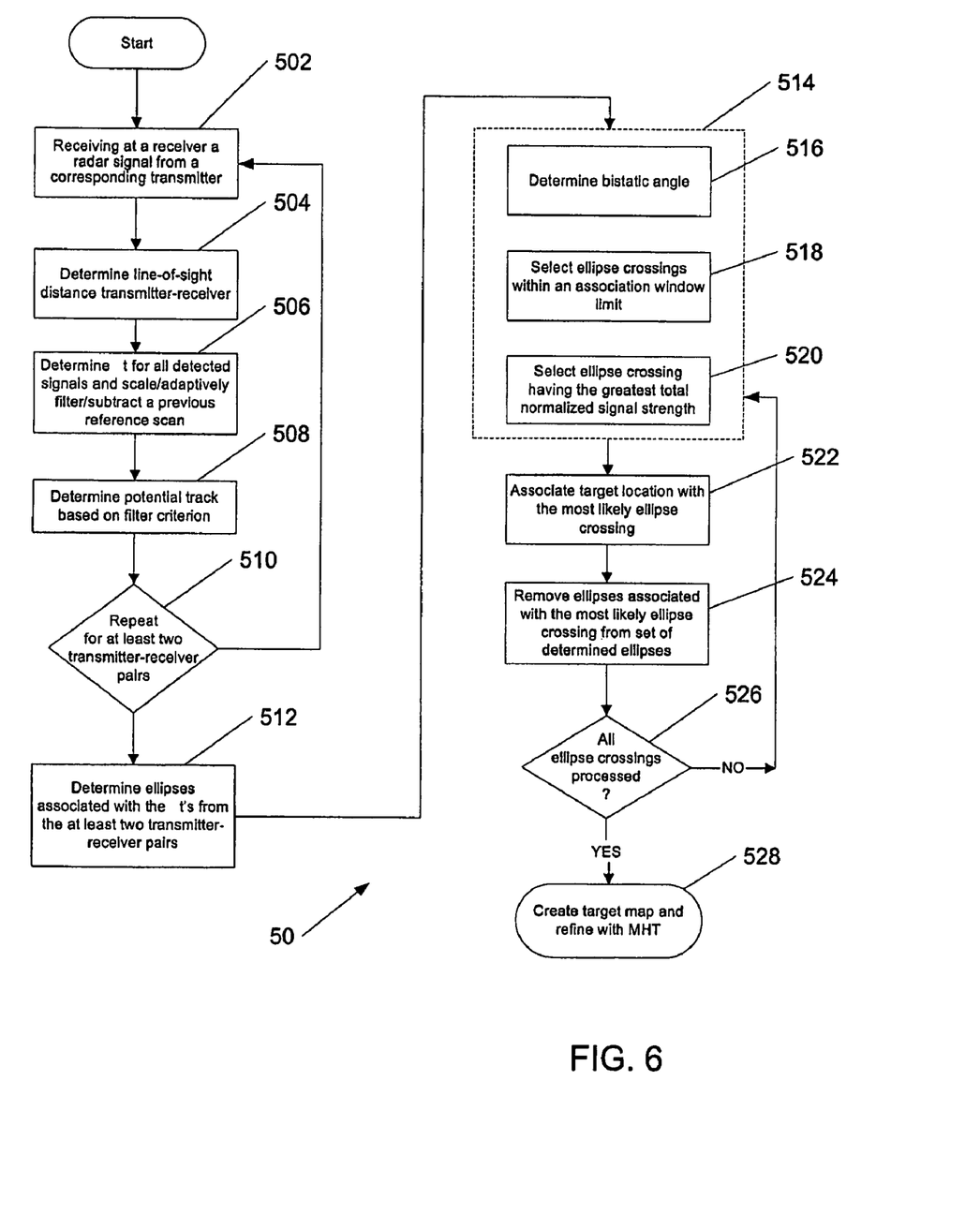
FIG. 6 is a process flow diagram for determining multiple targets with the method of the invention.

Referring now to FIG. 6, a process 50 for detecting multiple moving targets using UWB multistatic radar having at least one transmitter and a plurality of receivers includes receiving at two or more receivers (as mentioned above, a minimum of three receivers is required to resolve ambiguities) an ultra-short, i.e., wide bandwidth radio frequency radar pulse that can be encoded for communications between transmitter and receivers, step 502. With properly synchronized timing between transmitter(s) and receivers, a direct path signal received by a receiver from the transmitter defines a line-of-sight distance between the transmitter and the associated receiver, step 504. The emitted radar pulses are backscattered or forward scattered from stationary and moving objects, with the time difference Δt between the scattered signal and the direct signal defining an ellipse having the corresponding transmitter and receiver as foci, step 506. The scattered radar data are processed in a matched filter using a complex finite-impulse-response (FIR) filter that uses the averaged time series response of the direct path arrival as filter weights. The weights are convolved with a complex bandpass filter to further reduce band noise.

Further in step 506, an adaptive filtering/subtraction algorithm is employed to generate a reference waveform that represents consistent, stationary energy that is subsequently subtracted from scans collected by the receiver. The reference waveform can be constructed, for example, from a predetermined number of preceding scans and will therefore substantially only show stationary backscattering objects. A range-dependent exponential smoothing algorithm with a convergence rate constant that decreases with range is used. Exponential smoothing is a simple algorithm for predicting the next value in a time series given the current value and the current prediction.

Each range cell (i.e., an area surveyed) has a certain noise level which can increase for cells near the direct signal path, for example, due to residual energy from the subtraction process described above. Therefore, each cell is advantageously normalized by a long-time average power in the cell, with the normalization also aiding in maintaining a constant false alarm rate.

The disclosed systems and methods are optimized for operating in dense foliage which can result in unwanted multi-path returns and extended regions of high levels of residual clutter. To this end, a split window normalization routine can be applied as a filter criterion in step 506, which operates for each scan across the range delay window of interest and estimates a normalization factor for each range delay cell. On a time axis, the energy in a window to the left (shorter times) and in another window to the right (longer times) of the range delay window is measured. The width of the left and right window is selected so as to measure the average power without introducing errors due to fluctuations in background power. If the right window has significantly more energy than the left window (indicative of significant multipath returns), then only the left window is used; otherwise the average from the two windows is used as a noise normalization factor. In this way, target returns that have substantial multipath returns following the initial peaks are preserved.

Target tracking may be done in three stages. In a first stage on the node level, a transmitter-receiver node pair generates radar scan data vs. time that is processed according to the routines outlined in steps 506 and 508. The node level tracking algorithm associates successive peaks that meet certain criteria, such as target speed, with the initially detected target. Tracks having normalized signal levels below the predetermined threshold value are eliminated.

The range delay Δt of each transmitter-receiver node pair generates an ellipse of possible locations, step 512. Each possible combination of ellipses determined in step 512 is examined for each target detection to determine the most likely target location, for example, by optimizing a cost function, step 514, indicated by the dashed box. The cost function may have multiple input variables representing a space of selection criteria, with the most likely target location and/or target class or type obtained through optimization of the cost function. Determining the cost function may include determining the bistatic angle of the target based on the target signal level and radar cross section, step 516, selecting the combination of ellipses producing a crossing within an association window limit, step 518, and/or identifying the ellipse crossing with the highest total returned normalized signal energy, step 520. The signal energy may be normalized to produce a signal indicative of, for example, the size of a target. The exemplary steps 516, 518, and 520 in FIG. 5 may be executed in any suitable order, and other suitable selection criteria may be added.

Once the ellipse crossings are associated with a particular target location, step 522, the ellipses for that target location are removed from the set of detected ellipses and are no longer considered for additional target localizations, step 524. If all potential ellipse crossings have been examined, step 526, then the process terminates in step 528, optionally producing a target map of target positions that may be transmitted for display to another location, for example, to a central observation room. Otherwise, the process 50 returns to step 514 to optimize the cost function for the remaining ellipse crossings for determining another potential target.

A multi-hypothesis tracker (MHT), indicated in step 528, can be used to reduce false alarms and refine target track estimation. Multi-hypothesis techniques can resolve ambiguities between, for example, signals arising from the same target and traveling via separate propagation paths, and signals arising from different targets.

Several techniques can be used to classify an identified target. One technique is to build a three-dimensional image of a target, as it is tracked over time, from the multiple vantage points provided by the plurality of receivers. For example, characteristic parameters of expected targets correlating their radar cross section with their size and location can be used. The parameters can be acquired, for example, in field tests and stored at the node level. Additionally, the relative motion of parts of targets can be analyzed and potentially differentiated at the node level by examining the received signal energy over multiple target data acquisitions. For example, for determining movement of a part of a target, such as a limb of a person, relative to the rest of the target, i.e. the person's body, a predetermined number of scans preceding the current scan may be time-shifted to detect the change in location of the limb over time and thereby its velocity, whereafter the energy in the ranges of interest are summed. For example, a human would show different velocities, when swinging his arms or legs, which would be different from those of, for example, a deer. These signals could be distinguished from those produced, for example, by a small vehicle where all the parts would move in unison. Moreover, the size of different targets and the material from which they are made can cause different return signal strengths for a given range and aspect angle, further aiding in the differentiation between, for example, animals and vehicles. Further, targets viewed from different aspects may present differing radar cross sections depending on the vantage point. For example, a human target on foot will have a relatively constant RCS when viewed from different angles while a vehicle will exhibit a varying RCS depending upon the angle from which it is viewed.

While the invention has been disclosed in connection with the preferred embodiments shown and described in detail, various modifications and improvements may be made thereto without departing from the spirit and scope of the invention. By way of example, although the illustrative embodiments are depicted as having a fixed number of transmitters and/or receivers, this need not be the case. Instead additional UWB radar transmitters and/or receivers may be integrated in the network, whereby each transmitter/receiver may advantageously be configured with its own IP address. The various transmitters and/or receivers may be connected by wires, optical fibers, and/or wireless. Accordingly, the spirit and scope of the invention is to be limited only by the following claims.

What is claimed is:

1. A method for identifying a target by using a multistatic radar system having at least one radar transmitter and a plurality of radar receivers arranged in node pairs, the method comprising:

receiving at a receiver a radar signal from a corresponding transmitter of the node pair;

determining probable target data based on the received radar signal;

comparing the probable target data from at least two transmitter-receiver node pairs;

identifying from the compared probable target data a location of a first target;

removing from the probable target data the data associated with the first target location; and determining a location of an additional target from the remaining probable target data.

2. The method of claim 1, comprising suppressing out-of-band energy of the received signal.

3. The method of claim 1, comprising time-aligning successively received signals.

4. The method of claim 1, comprising scaling, smoothing and normalizing the received signals.

5. The method of claim 1, wherein determining probable target data comprises determining backscattered energy of the received signal and comparing the backscattered energy with a predetermined reference value.

6. The method of claim 1, wherein determining probable target data comprises determining a target speed and comparing the determined target speed with a probable target speed of the target.

7. The method of claim 1, wherein identifying the location of the first target comprises determining from the probable target data a total backscattered energy, and selecting as the location of the first target the location having a greatest total backscattered energy.

8. The method of claim 1, wherein identifying the location of the first target comprises associating a cost function with potential target locations, said cost function representing a measure of likelihood that a target is present at the location, and selecting the location of the first target by optimizing the cost function.

9. The method of claim 1, comprising classifying the first target.

10. The method of claim 9, wherein classifying comprises assigning a target type of vehicles, livestock, or humans.

11. The method of claim 9, wherein classifying comprises classifying the first target based on size of the first target, radar cross section of the first target, or both.

12. The method of claim 9, wherein classifying comprises:

building a three-dimensional image of the target by analyzing target data received from a plurality of the node pairs;

monitoring changes in the three-dimensional image during a predetermined time; and assigning a target type to the target based on the monitored changes.

13. The method of claim 12, wherein the target type is assigned based on a change in radar cross section when the three-dimensional image is viewed from different directions.

14. The method of claim 1, comprising estimating a range for a likely bistatic angle for the probable target data from forward-scattering and backscattering radar cross sections.

15. The method of claim 1, comprising recording a target map with the first target and at least one additional target.

16. The method of claim 1, comprising communicating between the radar receiver and the corresponding transmitter using the received radar signal.

17. The method of claim 16, wherein the received radar signal comprises an encoded signal.

18. The method of claim 17, wherein the received radar signal comprises a wide bandwidth radio frequency radar pulse.

19. The method of claim 1, wherein determining comprises filtering the received radar signal and determining the probable target data from the filtered radar signal.

20. The method of claim 1, comprising transmitting the received radar signal or the probable target data from at least two transmitter-receiver node pairs to a central node, wherein identifying comprises identifying the location of the first target at the central node.

21. The method of claim 1, comprising communicating between a radar receiver and a corresponding transmitter in a node pair using a radar signal.

22. The method of claim 21, wherein the radar signal comprises an encoded signal.

23. The method of claim 22, wherein the radar signal comprises a wide bandwidth radio frequency radar pulse.

24. A method for identifying a target by using a multi static radar system having at least one radar transmitter and a plurality of radar receivers forming node pairs, the method comprising:

receiving, at two or more receivers defining node pairs, target data associated with a target, the received target data defining a target ellipse at each of the node pairs;

determining points of intersection between the target ellipses;

associating a cost function with the points of intersection; and assigning a first target to the point of intersection having the lowest cost function.

25. The method of claim 24, wherein the cost function comprises a received normalized pulse energy, a bistatic angle for the received pulse energy, a range velocity characteristic of the target, a separation between closely-spaced points of intersection located on at least three intersecting ellipses, or any combination thereof.

26. The method of claim 24, further comprising:

removing the target ellipses that include the target data for the first target; and assigning a second target to the point of intersection having the lowest cost function.

27. The method of claim 24, wherein the node pairs receive the target data from different vantage points, said target data indicative of a size and a radar cross section of a target.

28. A multi static radar tracking system comprising:

at least one radar transmitter and a plurality of radar receivers arranged in node pairs, said at least one transmitter emitting radar signals;

a filter for identifying at the receiver level from a radar signal received at the receiver of a node pair a target ellipse for a potential target; and a real-time radar signal processing engine that determines from at least two target ellipses a first target location, and determines an additional target location after removing the target ellipses used to determine the first target location.

29. The multi static radar tracking system of claim 28, wherein a radar transmitter and a radar receiver in a node pair communicate with each other via the radar signals.

30. The multi static radar tracking system of claim 29, wherein the radar signals are encoded.

31. The multi static radar tracking system of claim 28, wherein the real-time radar signal processing engine is located at a central node.

32. The multi static radar tracking system of claim 31, wherein the filter is located at a radar receiver.

33. The multi static radar tracking system of claim 31, wherein the radar signal comprises a wide bandwidth radio frequency radar pulse.

34. A method for identifying a target by using a multistatic radar system having at least one radar transmitter and a plurality of radar receivers arranged in node pairs, the method comprising:

receiving at a receiver a radar signal from a corresponding transmitter of the node pair, the radar signal being employed for communication between the receiver and the corresponding transmitter;

determining probable target data based on the radar signal;

comparing the probable target data from at least two transmitter-receiver node pairs; and identifying from the compared probable target data a location of a first target.

35. The method of claim 34, wherein the radar signal comprises an encoded signal.

36. The method of claim 35, wherein the radar signal comprises a wide bandwidth radio frequency radar pulse.

* * * * *